United States Patent Office 2,839,557
Patented June 17, 1958

2,839,557
PROCESS OF PREPARING HALOGENOHYDRO-CARBON SILANES

Albrecht Zappel, Opladen, Germany, assignor to Farbenfabriken Bayer Aktiengesellschaft, Leverkusen, Germany, a corporation of Germany No Drawing. Application February 2, 1955
Serial No. 485,823

Claims priority, application Germany February 5, 1954

4 Claims. (Cl. 260—448.2)

The present invention relates to improvements in the production of organic compounds containing halogen and silicon and to the compounds thus obtained.

According to prior teachings organo-silicon compounds are produced by reacting organic compounds containing double bonds and compounds containing SiH groups; in this reaction which is carried out in the presence of catalysts under different conditions of temperature and pressure depending upon the nature of the olefin applied, the SiH group is added to the double bond of the organic compound. As catalysts there may be used nickel, palladium, platinum and organic peroxides.

In general, the yields obtained in the previously known process carried out in the presence of the aforesaid catalysts, are extremely poor if the olefin employed as reactant is substituted by halogen and particularly if a perhalogenated olefin is used. Experiments carried out for instance with trifluorochloroethylene and trichlorosilane as reactants in the liquid phase under superatmospheric pressure in the absence of catalysts or in the presence of benzoyl peroxide, lauroyl peroxide, phthalomono peracid, γ-chlorobenzoyl peroxide or succinic acid peroxide as catalyst were without success. The same holds true of the reaction carried out in the presence of Raney nickel or platinum asbestos when operating both in the liquid phase under superatmospheric pressure and in the gaseous phase at temperatures up to 300° C.

It is an object of the present invention to provide an efficient and economic process of producing halogenohydrocarbon-silicon compounds.

Another important object of the present invention is to provide efficient catalysts for the economic production of halogenohydrocarbon-silicon compounds.

A further object is to provide halogenohydrocarbon-silicon compounds in satisfactory yields.

Further objects of the invention will become apparent as the following description proceeds.

In accordance with the present invention it has been found that halogenohydrocarbon-silicon compounds are obtained in good yields by reacting a compound containing at least one ≡SiH group with a perhalogenated olefin in the presence of an ozone solution as catalyst. The reaction may be carried out under pressure of up to 100 atmospheres and at temperatures within the range of 0–150° C., preferably 40–100° C. The silane component and the olefin component may be employed at varying proportion. An excess of the olefin component gives rise to higher molecular weight halogenohydrocarbon compounds due to polymerization. On the other hand, an excess of the silane component reduces the reaction velocity. It is preferable to carry out the reaction using the components at a stoichiometrical proportion or using the silane component at a higher ratio but substantially not exceeding five times that of the stoichiometrical proportion. The free valences of the silicon in the compound containing at least one ≡SiH group may be satisfied with halogen, hydrogen or organic radicals such as alkyl, aryl or aralkyl.

In the reaction carried out in the presence of an ozone solution as catalyst according to the invention, a fluoromethane or the silane employed as a reactant, for instance trichlorosilane, may be used as solvent. In general, it has proved advantageous to use ozone in an amount of preferably 3–15% calculated on the olefin component of the reaction. The concentration of ozone in the solvent or the silane component respectively may vary between about 1–10%. It is irrelevant to the efficiency of the catalyst whether ozone is present as a mere physical solution or as ozonide of the olefin employed as reactant.

The following examples are given to illustrate the method of producing halogenohydrocarbon-silicon compounds according to the present invention but do not limit the invention in any way.

Example 1

Trifluoromonochloro-ethylene and trichloro silane are reacted at a molecular ratio of 1:5 in a sealed tube. The reaction is carried out in the presence of a solution of ozone in trichloromonofluoro methane which contains about 10% of ozone calculated on the olefin. After about 3 days the reaction is finished and the trifluoromonochloro ethylene consumed. After fractionating the reaction mixture the compound $Cl_3SiC_2F_3ClH$ is obtained in a yield of 30% calculated on the reacted trifluoromonochloro ethylene; B. P.: 62° C. at 100 Torr (mm. Hg); 123° C. at 760 Torr. The compound $Cl_3SiC_2F_3ClH$ upon analysis shows the following comparison with theory:

| | Found | Theory for $Cl_3SiC_2F_3ClH$ |
|---|---|---|
| | Percent | Percent |
| Si | 10.9 | 11.05 |
| hydrolyzable Cl | 42.0 | 42.4 |
| entire Cl content | 56.7 | 56.5 |
| F | 22.4 | 22.6 |
| molecular weight | 248 | 252 |

The remainder of the reaction mixture is a high boiling oily product which also contains silicon and hydrolyzable chlorine at a ratio of 1:3.

Example 2

Trichlorosilane and trifluoromonochloro ethylene at the molecular ratio 2:1 are reacted in a sealed tube at 60–70° C. for some days. The reaction is carried out in a solution of ozone in $SiHCl_3$, which contains about 5% of ozone calculated on the olefin. Besides high boiling products of the general formula $Cl_3Si(C_2F_3Cl)_nH$, the monomeric compound $Cl_3SiC_2F_3ClH$ is obtained in a yield of 40%.

Example 3

Trichloro silane and tetrafluoro ethylene at the molecular ratio 2:1 are reacted in a sealed tube at 50–60° C. for some days. Ozone dissolved in $SiHCl_3$ at a concentration of 5% calculated on the olefin is used as catalyst. Besides high molecular weight products, the monomeric compound $Cl_3SiC_2F_4H$ is obtained in a yield of approximately 40%; B. P.: 54° C. at 100 Torr. The compound $Cl_3SiC_2F_4H$ upon analysis shows the following comparison with theory:

|  | Found | Theory for $Cl_3SiC_2F_4H$ |
| --- | --- | --- |
|  | Percent | Percent |
| Si | 11.1 | 11.4 |
| Cl | 44.8 | 44.0 |
| F | 31.7 | 32.0 |
| molecular weight | 234 | 236.5 |

Example 4

Monochlorosilane and trifluoromonochloro ethylene at the molecular ratio 1:3 are reacted in a sealed tube at about 60° C. for some days. A solution of ozone in trichloromonofluoro methane is used as catalyst. After opening the tube only a slight quantity of unreacted $C_2F_3Cl$ is determined in the gaseous phase. The reaction yields addition products containing from one to three halogeno ethyl groups attached to one chloro silicon radical. A substantial quantity of these addition products consists of $ClSi(C_2F_3ClH)_3$.

I claim:

1. Process for producing halogenohydrocarbon-silicon compounds which comprises reacting a perhalogenated olefin with a compound containing at least one SiH group, the remaining valences of the silicon in the compound being satisfied with a member selected from the group consisting of halogen atoms, hydrogen atoms, alkyl radicals, aryl radicals, and aralkyl radicals, in the presence of an ozone solution at temperatures of between about 0–100° C. and at superatmospheric pressure.

2. Process for producing halogenohydrocarbon-silicon compounds which comprises reacting a perhalogenated olefine with a compound containing at least one SiH group, the remaining valences of the silicon in the compound being satisfied with a member selected from the group consisting of halogen, hydrogen, alkyl, aryl and aralkyl, in the presence of an ozone solution at temperatures of between 40–80° C. at superatmospheric pressure.

3. Process according to claim 1, wherein a solution of ozone in chlorofluoro methane is used as catalyst.

4. Process according to claim 1, wherein said compound containing at least one SiH group is used as solvent for ozone.

References Cited in the file of this patent

UNITED STATES PATENTS

| 2,686,194 | Passino et al. | Aug. 10, 1954 |
| 2,721,873 | MacKenzie et al. | Oct. 25, 1955 |

FOREIGN PATENTS

| 684,597 | Great Britain | Dec. 24, 1952 |
| 1,090,847 | France | Oct. 20, 1954 |

OTHER REFERENCES

Ellis, "Chemistry of Synthetic Resins," vol. II (1935), Reinhold Publishing Co., New York, publishers, pp. 1038, 1039.